(12) United States Patent  (10) Patent No.: US 8,892,423 B1
Danielyan et al.  (45) Date of Patent: Nov. 18, 2014

(54) METHOD AND SYSTEM TO AUTOMATICALLY CREATE CONTENT FOR DICTIONARIES

(75) Inventors: Tatiana Danielyan, Moscow (RU); Tatiana Parfentieva, Moscow region (RU); Vladimir Selegey, Moscow (RU)

(73) Assignee: ABBYY InfoPoisk LLC (RU)

( * ) Notice: Subject to any disclaimer, the term of this patent is extended or adjusted under 35 U.S.C. 154(b) by 827 days.

(21) Appl. No.: 13/004,019

(22) Filed: Jan. 10, 2011

Related U.S. Application Data

(63) Continuation-in-part of application No. 11/548,214, filed on Oct. 10, 2006, now Pat. No. 8,078,450.

(51) Int. Cl.
*G06F 17/21* (2006.01)

(52) U.S. Cl.
USPC .................... 704/10; 704/4; 704/8; 704/9

(58) Field of Classification Search
CPC .................................................. G06F 17/2735
USPC ....................................................... 704/1–10
See application file for complete search history.

(56) References Cited

U.S. PATENT DOCUMENTS

| | | |
|---|---|---|
| 5,268,839 A | 12/1993 | Kaji |
| 5,289,376 A * | 2/1994 | Yokogawa ...................... 704/10 |
| 5,386,556 A | 1/1995 | Hedin et al. |
| 5,418,717 A | 5/1995 | Su et al. |
| 5,426,583 A | 6/1995 | Uribe-Echebarria Diaz De Mendibil |
| 5,677,835 A | 10/1997 | Carbonell et al. |
| 5,678,051 A | 10/1997 | Aoyama |
| 5,687,383 A | 11/1997 | Nakayama et al. |
| 5,715,468 A | 2/1998 | Budzinski |
| 5,768,603 A | 6/1998 | Brown et al. |
| 5,787,386 A * | 7/1998 | Kaplan et al. ...................... 704/8 |
| 5,787,410 A | 7/1998 | McMahon |
| 5,794,050 A | 8/1998 | Dahlgren et al. |
| 5,826,219 A | 10/1998 | Kutsumi |

(Continued)

FOREIGN PATENT DOCUMENTS

| | | |
|---|---|---|
| EP | 2400400 A1 | 12/2001 |
| WO | 2011160204 A1 | 12/2011 |

OTHER PUBLICATIONS

Hutchins, Machine Translation: Past, Present, Future, Ellis Horwood, Ltd., Chichester, UK, 1986.

(Continued)

*Primary Examiner* — Shaun Roberts
(74) *Attorney, Agent, or Firm* — LeighAnn Weiland; Veronica Weinstein

(57) ABSTRACT

Embodiments of the present invention disclose computer-implemented method for generating examples for electronic dictionaries to serve as an aid to translation between languages, comprising: for at least one dictionary entry comprising a headword $W_j$ in a source language and at least one translation $T_{j1}, T_{j2}, \ldots T_{jn}$ for the headword $W_j$ in a target language: generating a first set comprising possible forms for the headword $W_j$ in the source language and a second set comprising possible forms for each translation $T_{j1}, T_{j2}, \ldots T_{jn}$ in the target language; searching a corpus of translations for at least one translation sentence pair that includes the headword $W_j$, or one of its generated forms, in a first part of the pair, and a translation $T_{jn}$ or one of its generated forms, in a second part of the pair; and providing each translation sentence pair to a user.

34 Claims, 4 Drawing Sheets

(56) References Cited

U.S. PATENT DOCUMENTS

| | | | |
|---|---|---|---|
| 5,884,247 A | 3/1999 | Christy | |
| 6,006,221 A | 12/1999 | Liddy et al. | |
| 6,055,528 A | 4/2000 | Evans | |
| 6,064,951 A * | 5/2000 | Park et al. | 704/8 |
| 6,076,051 A | 6/2000 | Messerly et al. | |
| 6,081,774 A | 6/2000 | de Hita et al. | |
| 6,182,028 B1 | 1/2001 | Karaali et al. | |
| 6,233,544 B1 | 5/2001 | Alshawi | |
| 6,233,545 B1 * | 5/2001 | Datig | 704/2 |
| 6,243,670 B1 | 6/2001 | Bessho et al. | |
| 6,246,977 B1 | 6/2001 | Messerly et al. | |
| 6,275,789 B1 | 8/2001 | Moser et al. | |
| 6,356,864 B1 | 3/2002 | Foltz et al. | |
| 6,381,598 B1 | 4/2002 | Williamowski et al. | |
| 6,393,388 B1 * | 5/2002 | Franz et al. | 704/4 |
| 6,393,389 B1 * | 5/2002 | Chanod et al. | 704/7 |
| 6,442,524 B1 * | 8/2002 | Ecker et al. | 704/277 |
| 6,463,404 B1 | 10/2002 | Appleby | |
| 6,490,548 B1 * | 12/2002 | Engel | 704/10 |
| 6,601,026 B2 | 7/2003 | Appelt et al. | |
| 6,604,101 B1 | 8/2003 | Chan et al. | |
| 6,622,123 B1 | 9/2003 | Chanod et al. | |
| 6,651,220 B1 * | 11/2003 | Penteroudakis et al. | 715/236 |
| 6,778,949 B2 | 8/2004 | Duan et al. | |
| 6,871,199 B1 | 3/2005 | Binnig et al. | |
| 6,901,402 B1 | 5/2005 | Corston-Oliver et al. | |
| 6,917,920 B1 * | 7/2005 | Koizumi et al. | 704/277 |
| 6,928,448 B1 | 8/2005 | Franz et al. | |
| 6,937,974 B1 | 8/2005 | d'Agostini | |
| 6,947,923 B2 | 9/2005 | Cha et al. | |
| 6,965,857 B1 | 11/2005 | Decary | |
| 6,983,240 B2 | 1/2006 | Ait-Mokhtar et al. | |
| 7,200,550 B2 | 4/2007 | Menezes et al. | |
| 7,263,488 B2 | 8/2007 | Chu et al. | |
| 7,403,889 B2 * | 7/2008 | Abe et al. | 704/7 |
| 7,475,015 B2 | 1/2009 | Epstein et al. | |
| 7,483,828 B2 * | 1/2009 | Abir | 704/8 |
| 7,565,281 B2 * | 7/2009 | Appleby | 704/2 |
| 7,664,628 B2 * | 2/2010 | Kojo | 704/4 |
| 7,672,831 B2 | 3/2010 | Todhunter et al. | |
| 7,739,102 B2 | 6/2010 | Bender | |
| 8,041,697 B2 * | 10/2011 | Rayner et al. | 707/705 |
| 8,078,450 B2 | 12/2011 | Anisimovich et al. | |
| 8,145,473 B2 | 3/2012 | Anisimovich et al. | |
| 8,214,199 B2 | 7/2012 | Anismovich et al. | |
| 8,229,730 B2 | 7/2012 | Van Den Berg et al. | |
| 8,229,944 B2 | 7/2012 | Latzina et al. | |
| 8,271,453 B1 | 9/2012 | Pasca et al. | |
| 8,285,728 B1 | 10/2012 | Rubin | |
| 8,301,633 B2 | 10/2012 | Cheslow | |
| 8,402,036 B2 | 3/2013 | Blair-Goldensohn et al. | |
| 8,533,188 B2 | 9/2013 | Yan et al. | |
| 8,548,951 B2 | 10/2013 | Solmer et al. | |
| 8,577,907 B1 | 11/2013 | Singhal et al. | |
| 2003/0176999 A1 | 9/2003 | Calcagno et al. | |
| 2004/0122656 A1 * | 6/2004 | Abir | 704/4 |
| 2005/0155017 A1 | 7/2005 | Bertis et al. | |
| 2005/0209844 A1 | 9/2005 | Wu et al. | |
| 2009/0063472 A1 | 3/2009 | Pell et al. | |
| 2010/0057438 A1 * | 3/2010 | Zhanyi et al. | 704/4 |
| 2011/0055188 A1 | 3/2011 | Gras | |
| 2011/0258229 A1 * | 10/2011 | Ni et al. | 707/776 |
| 2011/0301941 A1 | 12/2011 | De Vocht | |
| 2012/0023104 A1 | 1/2012 | Johnson et al. | |
| 2012/0030226 A1 | 2/2012 | Holt et al. | |
| 2012/0131060 A1 | 5/2012 | Heidasch et al. | |
| 2012/0197885 A1 | 8/2012 | Patterson | |
| 2012/0203777 A1 | 8/2012 | Laroco, Jr. et al. | |
| 2012/0221553 A1 | 8/2012 | Wittmer et al. | |
| 2012/0246153 A1 | 9/2012 | Pehle | |
| 2012/0296897 A1 | 11/2012 | Xin-Jing et al. | |
| 2013/0013291 A1 | 1/2013 | Bullock et al. | |
| 2013/0054589 A1 | 2/2013 | Cheslow | |
| 2013/0091113 A1 | 4/2013 | Gras | |
| 2013/0138696 A1 | 5/2013 | Turdakov et al. | |
| 2013/0185307 A1 | 7/2013 | El-Yaniv et al. | |
| 2013/0254209 A1 | 9/2013 | Kang et al. | |
| 2013/0282703 A1 | 10/2013 | Puterman-Sobe et al. | |
| 2013/0311487 A1 | 11/2013 | Moore et al. | |
| 2013/0318095 A1 | 11/2013 | Harold | |
| 2014/0012842 A1 | 1/2014 | Yan et al. | |

OTHER PUBLICATIONS

Bolshakov, I.A. "Co-Ordinative Ellipsis in Russian Texts:Problems of Description and Restoration" Proceedings of the 12th conference on Computational linguistics—vol. 1, pp. 65-67. Association for Computational Linguistics 1988.

Mitamura, T et al. "An Efficient Interlingua Translation System for Multi-lingual Document Production," Proceedings of Machine Translation Summit III, Washington DC, Jul. 2-4, 1991.

Mitamura, T., et al. "An Efficient Interlingua Translation System for Multi-lingual Document Production," Proceedings of Machine Translation Summit III, Washington, DC, Jul. 2-4, 1991.

Bolshakov, I.A. "Co-Ordinative Ellipsis in Russian Texts: Problems of Description and Restoration," Proceedings of the 12th Conference on Computational Linguistics—vol. 1, pp. 65-67. Association for Computational Linguistics.

Bolshakov, Igor A. , "Co-Ordinative Ellipsis in Russian Texts: Problems of Description and Restoration", Proceedings of the 12$^{th}$ conference on Computational linguistics, 1988, pp. 65-67, vol. 1, VINITI, Academy of Sciences of USSR, Moscow, 125219, USSR.

Hutchins, Mashine Translation: past, present, future, 1986, 382 pp, Ellis Horwood:Chichester, UK.

Mitamura, Teruko et al., "An Efficient Interlingua Translation System for Multi-Lingual Document Production", Jul. 2-4, 1991, Proceedings of Machine Translation Summit III, Washington DC.

* cited by examiner

101 file

I

1. *noun*

1) *(a folder or box for holding loose papers together and in order for easy reference)* папка, подшивка
Examples:
a file of correspondence — папка с материалами (документами)
2) *(a collection of information about a particular person or thing)* досье
Examples:
They were keeping a file on him — Они собирали досье на него
3) *Computing (a collection of data, programs, etc. stored in a computer's memory or on a storage device under a single identifying name)* файл
Examples:
you can save the file to your hard disk — вы можете сохранить файл на свой диск

2. *verb [with obj.]*

1) *(place a document in a cabinet, box, or folder in a particular order)* регистрировать, подшивать
Examples:
the contract, when signed, is filed — контракт после подписания регистрируется
*Figurative* he still had the moment filed away in his memory — был один момент, который запомнился в его памяти
2) *(submit a legal document, application, or charge to be placed on record by the appropriate authority)* обращаться (с заявлением, прошением), подавать какой-л. документ
Examples:
charges were filed against him — против него были выдвинуты обвинения
*[no obj.]* the company had filed for bankruptcy — компания объявила о банкротстве

103 II

1. *noun*

1) *(a line of people or things one behind another)* очередь, ряд, вереница
Examples:
files of tourists — вереницы туристов
2) *Military (a small detachment of men)* шеренга, колонна
Examples:
a file of English soldiers had — колонны английских солдат

2. *verb [no obj., with adverbial of direction]*

(of a group of people) walk one behind the other, typically in an orderly and solemn manner
Examples:
the mourners filed into the church

105 III

1. *noun*

1) *(a tool with a roughened surface or surfaces, typically of steel, used for smoothing or shaping a hard material )* напильник, надфиль
Examples:
cross-cut file — поперечный напильник
to cut a file — делать насечку на напильнике
nail file — пилка для ногтей
2) *(a process with a tool with a roughened surface )* шлифовка, обработка напильником, опиливание
Examples:
to need the file — требовать отделки

2. *verb [with obj.]*

1) *(smooth or shape with a file)* — шлифовать, опиливать
Examples:
to file to a shape — придавать нужную форму напильником
never file your nails from the centre to the sides — никогда не обрабатывайте ногти от центра к краям
2) *(file something away/off, remove something by grinding it off with a file)* отпиливать

i) $T_{ji}$
        Examples:
            $<... W_j ...>$ — $<...T_{ji} ...>$

METHOD AND SYSTEM TO AUTOMATICALLY CREATE CONTENT FOR DICTIONARIES

This application is a continuation-in-part of U.S. Ser. No. 11/548,214, filed on Oct. 10, 2006, the entire specification of which is incorporated herein by reference.

FIELD

Embodiments of the present invention relate to a method and system for creating content for bilingual dictionaries in the form of Internet, electronic and paper dictionaries, compiling dictionaries, glossaries, encyclopedias, and other types of reference materials.

BACKGROUND

One of a dictionary user's basic needs is to find an appropriate translation for a word being looked up (hereinafter, the "lookup word"). The lookup word may be a new word that the user has encountered, for example while reading. Alternatively, the look word may be a word in a source language (e.g. English) that the user wishes to have translated into a corresponding word in a target language (e.g. Russian). Bilingual dictionaries usually comprise dictionary entries, each providing many translations (lexical meanings), examples, synonyms and other information, corresponding to a lookup word, One of the most challenging tasks for a dictionary producer is to help the dictionary reader/user find a good translation and all the relevant information about a lookup word. For example, the word "file" has several homonyms and several lexical meanings, and depending on context it may be translated into different parts of speech, and each part of speech may have several radically different meanings and different syntactical models of usage. For defining such syntactical models of lexical meanings in the dictionaries an appropriate markup form may be used which is useful when a user wants to translate something into a foreign language. In this case the dictionary can show, for example, in what discourse or subject field a lookup word is usually used, what preposition should be used before a noun, or what preposition should be used after a verb, in what collocations the lookup word is usually used, is a direct object required by the verb and where in the sentence this direct object must be placed, etc. Usage examples that illustrate the lexical meanings can greatly help the user to select the most appropriate translation, when he is reading the text in a foreign language or when he is trying to translate a collocation into a foreign language.

SUMMARY

Embodiments of the present invention disclose computer-implemented method for generating examples for electronic dictionaries to serve as an aid to translation between languages, comprising: for at least one dictionary entry comprising a headword $W_j$ in a source language and at least one translation $T_{j1}, T_{j2}, \ldots T_{jn}$ for the headword $W_j$ in a target language: generating a first set comprising possible forms for the headword $W_j$ in the source language and a second set comprising possible forms for each translation $T_{j1}, T_{j2}, \ldots T_{jn}$, in the target language; searching a corpus of translations for at least one translation sentence pair that includes the headword $W_j$, or one of its generated forms, in a first part of the pair, and a translation $T_{jn}$ or one of its generated forms, in a second part of the pair; and providing each translation sentence pair to a user. In another embodiment, the corpora are preliminarily indexed, and searching on the basis of the index is implemented.

Embodiments of the present invention also disclose a system for performing the aforesaid computer-implemented method.

Advantageously, embodiments of the present invention takes advantage of the large body (corpora) of translations that have been accumulated to (a) automatically retrieve translations for entire sentences or part of sentences, (b) automatically identify the most frequent word combinations, and (c) associate the translations thus obtained with a lexical meaning.

Other advantages of embodiments of the present invention will be apparent from the detailed description below.

BRIEF DESCRIPTION OF THE DRAWINGS

FIG. 1A shows an example of the entry "file" in an electronic bilingual English-Russian dictionary.

FIG. 1B shows a general framework of an entry in an electronic bilingual dictionary.

DETAILED DESCRIPTION

Figure 2:
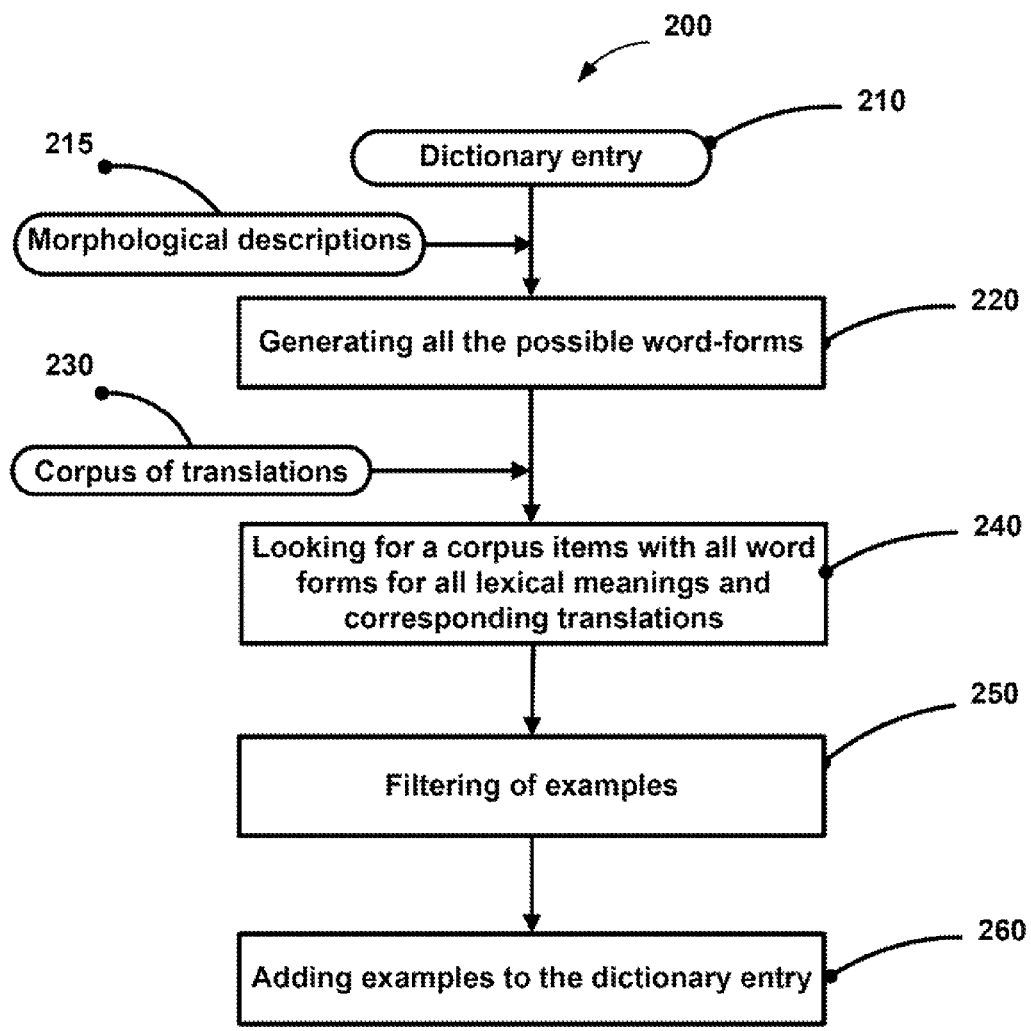
FIG. 2 shows a flowchart of operations performed by dictionary software, in accordance with an embodiment of the present disclosure.

Broadly, embodiments of the present invention disclose a content creation method for creating dictionary content based on bilingual or multilingual corpora of translations. Advantageously, in one embodiment, the dictionary content that is created comprises examples that serve as an aid to understanding dictionary entries. Embodiments of the present invention also disclose a content creation system to implement the content creation method of the present invention.

The structure of a dictionary entry in a bilingual dictionary may be very complex, as can be noted from the exemplar dictionary entry for the word "file" provided in FIG. 1A of the drawings.

The dictionary entry of FIG. 1A is from an electronic English-Russian dictionary, and as will be seen the entry has three different homonyms which are designated as Roman numerals—I (101), II (103) and III (105). The first homonym has three grammatical values including a noun (1.) and a verb (2.), and several lexical meanings—1) a folder or box; 2) a collection of information; 3) a collection of data, programs, etc. stored in a computer's memory. The meanings 1) and 2) may relate, for example, to topics "office work", "records management", "workflow", the 3) meaning—to "computing".

The second homonym II "a line of people or things one behind another" may be general, but if the text being translated with the aid of the dictionary contains terms related to "military" or "chess", these meanings should be selected. The third homonym II is very specific, and if the translated text contains terms related to "metalwork", "tools", "instrument", this meaning should be selected.

In addition to translations, the dictionary entry of FIG. 1A includes examples that serve as an aid to a reader/user to select the correct translation. The examples may take the form of examples of use, idioms, and set phrases. In one embodiment, the content creation method of the present invention generates examples for bilingual dictionaries, as will be explained in greater detail below.

Figure 1B:
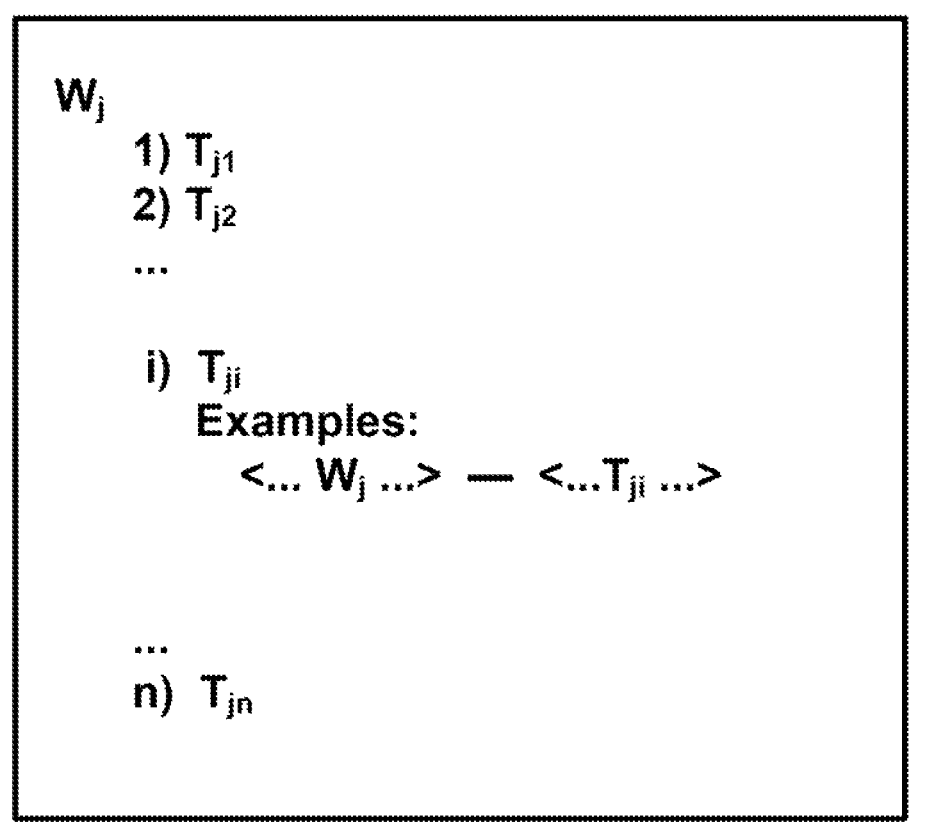

FIG. 1B of the drawings illustrates the overall scheme or structure of a dictionary entry for a bilingual dictionary that provides translations from a source language to a target language. As will be seen, the dictionary entry comprises a headword $W_j$ in the source language and multiple translations (lexical meanings) $T_{j1}, T_{j2}, \ldots T_{jn} \ldots$ in the target language, which may be optionally arranged (grouped) by homonymy, part of speech. Additionally, multiple translations may optionally be provided with labels that comment on their grammar, frequency, or subject domain. Each lexical meaning or group of lexical meanings may be accompanied by examples. In one embodiment, an example may comprise a pair of sentences in the source and target languages. The first sentence contains the $W_j$, and the second sentence contains one of the $T_{j1}, T_{j2}, \ldots T_{jn} \ldots$. For the sake of convenience, each example is usually placed below the corresponding $T_{ji}$.

A bilingual corpus of translations is made up of a multitude of sentences in the source and target languages that are translations of one another. With regard to such a bilingual corpus of translations sentences on the left are assumed to be in the source language, whereas sentences on the right are assumed to be in the target language. These assumptions are intended to be non-limiting as in other embodiments, sentences in the source language may be assumed to be on the right, whereas sentences in the target language may be assumed to be on the left. The same corpus of translations may be used to compile either a Lang1-to-Lang2 dictionary or a Lang2-to-Lang1 dictionary. A corpus of translations may be additionally marked up. There are corpora with grammatical, syntactic, and semantic mark-up, where sentence elements (words) are provided with part-of-speech tags, syntactic function tags (subject, predicate, object, etc.), or semantic tags (the domain of use, etc.). The availability of such mark-up and the ability to use such mark-up can greatly improve the relevance of search results and the quality of the dictionary.

In one embodiment, the content creation method of the present invention includes a concordance search technique wherein a bilingual (N-lingual) corpus of translations may be used to search in the left portion and in right portion of said corpus simultaneously. Additionally, the concordance search method may also be used to search by grammatical meanings, labels, etc.

FIG. 2 of the drawings illustrates a procedure for adding examples from the corpus of translations (230) to the dictionary entry comprising a headword $W_j$ (210) that already contains the translations $T_{j1}, T_{j2}, \ldots T_{jn} \ldots$. The procedure is part of the content creation method of the present invention and is performed based on a concordance search. Further, the procedure is performed by the content creation system of the present invention, (see FIG. 3), and includes the following steps:

1. At step 220, in one embodiment, a morphology engine uses morphological descriptions (215) to generate all the possible forms of the headword $W_j$ in the source language and all the forms for each of the $T_{j1}, T_{j2}, \ldots T_{jn} \ldots$ in the target language. In another embodiment, all lexemes of the corpora are preliminary indexed. For this purposes the index may be specific, for example, the index may contain the number of the pair of sentences and the number of the word.

2. At step 240, for each $T_{ji}$, the system looks for a corpus item that has the word $W_j$, possibly in one of the word forms, in the left part, and the $T_{ji}$, possibly in one of the word forms, in the right part. In one embodiment, searching procedure may be implemented on the basis of any method of search. In another embodiment, searching procedure may be based on the index.

3. The found sentence pairs are placed (260) into the entry $W_j$ immediately after the corresponding lexical meaning $T_{ji}$.

In one embodiment, the above procedure may be used once to add examples to all entries by consecutively (or simultaneously) going through all the headwords $W_1, W_2, \ldots W_{j'}, \ldots$ and their translations $T_{j1}, T_{j2}, \ldots$. In another embodiment, the procedure may be used dynamically and interactively, for example, if the user wishes to see all instances where the word $W_j$ is translated with $T_{ji}$, this may be achieved by the user simply clicking on or selecting $T_{ji}$.

It may happen that for some entries and translations too many examples are found. In that case, the examples may be filtered and arranged. In one embodiment, they may be arranged, for example, by frequency, by integral rankings supplied by users or experts, by rank of the corpus, or by other criteria. In one embodiment, very infrequent or specific examples may be rejected. In another embodiment examples may be labeled as medical, botanical or navigation terms etc. In one embodiment, the corpora, where examples are searched, may be ranked by authority, by experts estimations (assessment), by volume etc. Accordingly, the examples found in a particular corpus may inherit the rating of that corpus. In addition, a lexicographer or expert may be involved in manually selecting the best dictionary examples.

In one embodiment, the multitude of examples may be filtered (step 250) by labels, for example, by part-of-speech labels, if the corpus includes grammatical mark-up or a very simple context analyzer to deduce the part of speech from the context (e.g. a preceding article) or from the word form specific to a part of speech. For example, the presence of a preposition, article, particle or other specific word before or after the translated word may govern the selection of the part of speech, but "to" may be a preposition, but may indicate an infinitive of a verb. In such indistinct cases the other indications may be used.

In one embodiment, the examples may also be filtered by special labels that indicate that a given lexical meaning belongs to a specific subject domain. For example, referring to FIG. 1A, the filtering may be used so that examples belonging to a common lexicon cannot be inserted into a lexical meaning with a special label, such as "military" or "chess". Likewise, the filtering may ensure that only examples with labels "military" or from a specifically marked corpus should be added to a corresponding lexical meaning.

Advantageously, examples in a dictionary entry should differ from one another. To this end, in one embodiment, a very simple analyzer may be used to select unique examples. The analyzer may function by computing a similarity between two examples. In one embodiment, any heuristic methods may be used. If an example is similar to one already selected, then it is not added, as its effect would merely be cumulative. In another embodiment, more complex analysis algorithms may be employed, which analyze the surface syntactic structure of the example sentences or which compare the deep structures of the example sentences. Such analyzer that can determine not only syntactical structure of the sentence, but also its semantic structure. When such analyzer is used, the examples with the same surface syntactic structures may be identified as non-unique.

In one embodiment, under certain conditions, examples added to the dictionary may be semantically expanded. In this case, those sentences may be added to the dictionary which do not contain the translation $T_{ji}$ but which contain a word semantically close to $T_{ji}$ or synonymous with $T_{ji}$. For example, two examples may have the same deep semantic structures, but a bit different surface syntactic structures. Then, the differing parts of sentences may be considered as possible translations of each other.

In one embodiment, each lexical meaning in the bilingual dictionary may be connected to lexical-semantic dictionary. Each lexical meaning in the lexical-semantic dictionary belongs to some semantic class. The semantic classes are semantic notions (semantic entities) and named semantic classes arranged into semantic hierarchy—hierarchical parent-child relationships similar to a tree. In general, a child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

The semantic hierarchy is a universal, language-independent structure, and the semantic classes may include lexical meanings of various languages, which have some common semantic properties and may be attributed to the same notion, phenomenon, entity, situation, event, object type, property, action, and so on. Semantic classes may include many lexical meanings of the same language, which differ in some aspects and which are expressed by means of distinguishing semantic characteristics (semantemes). Semantemes express various properties of objects, conditions, and processes, which may be described in the language-independent semantic structure and expressed in natural languages grammatically and syntactically (for example, number, gender, aspect and tense of actions, degree of definiteness, modality, etc.), or lexically. So, lexical meanings are provided with distinguishing semantemes.

The system of semantemes includes language-independent semantic attributes, which express not only semantic characteristics but also stylistic, pragmatic and communicative characteristics. Some semantemes can be used to express an atomic meaning which finds a regular grammatical and/or lexical expression in a language. For example, the semantemes may describe specific properties of objects (for example, "being flat" or "being liquid") and are used in the descriptions as restriction for deep slot fillers (for example, for the verbs "face (with)" and "flood", respectively). The other semantemes express the differentiating properties of objects within a single semantic class, for example, in the semantic class HAIRDRESSER the semanteme <<RelatedToMen>> is assigned to the lexical meaning "barber", unlike other lexical meanings which also belong to this class, such as "hairdresser", "hairstylist", etc.

Lexical meanings may be provided by pragmatic description, which allows the system to assign a corresponding theme, style or genre to texts and objects of the semantic hierarchy. For example, "Economic Policy", "Foreign Policy", "Justice", "Legislation", "Trade", "Finance", etc. Pragmatic properties can also be expressed by semantemes.

Each lexical meaning in the lexical-semantic dictionary has its surface (syntactical) model which includes one or more syntforms, as well as, idioms and word combinations with the lexical meaning. Syntforms may be considered as "patterns" or "frames" of usage. Every syntform may include one or more surface slots with their linear order description, one or more grammatical values expressed as a set of grammatical characteristics (grammemes), and one or more semantic restrictions on surface slot fillers. Semantic restrictions on a surface slot filler are a set of semantic classes, whose objects can fill this surface slot.

Thus, the fact that the $W_j$ and $T_{ji}$ belong to the same semantic class and have the same semantemes and pragmatic descriptions may be a significant indication in favor of adding the example into the dictionary. The idioms and word combinations with the lexical meaning which have been assigned to the lexical meanings may also be added as examples into a bilingual dictionary. Lexical meanings which are semantically close to $T_{ji}$ can be found automatically in the same semantic class which contains the W and $T_{ji}$ (for example, derivatives of $T_{ji}$ or meanings of the same part of speech with the same or similar set of semantemes or labeled as synonymous).

In one embodiment, the set of examples thus obtained are added directly into the dictionary. In another embodiment, the set of examples is generated and displayed to the user on demand, for example when the user clicks the corresponding button or clicks on the corresponding lexical meaning. In still another embodiment, the set of examples thus obtained may used as raw material by a lexicographer to compile a new dictionary.

In still another embodiment, the set of examples thus obtained which includes translations semantically close to $T_{ji}$, may be added directly into the dictionary next to the lexical meaning $T_{ji}$. In another embodiment, the set of examples, which includes translations semantically close to $T_{ji}$ can be suggested to a lexicographer for further processing. In still another embodiment, a representative set of examples which contain semantically close or completely new yet frequent translations may serve as grounds to add a new lexical meaning into the dictionary, either manually by a lexicographer or automatically. The aforementioned methods of analysis that analyze the surface syntactic structures of example sentences or compare the deep structures of the example sentences can identify such semantically close or completely new translations and add them into the entry automatically.

The numerous large corpora of translations that have been accumulated make it possible to retrieve translations for entire sentences or part of sentences, but they cannot be used to automatically identify the most frequent word combinations and to associate the translations thus obtained with a lexical meaning. Advantageously, embodiments of the present invention solve this problem.

Additionally, a lexicographer or any other user need to make a special query only if they think that these word combinations may be available in the corpora. If there are too many examples, the availability of such corpora is of no help to lexicographers, who need identify useful examples when compiling a dictionary, nor to users who translate texts using a dictionary. Advantageously, embodiments of the present invention automatically generate examples, as described above.

Figure 3:
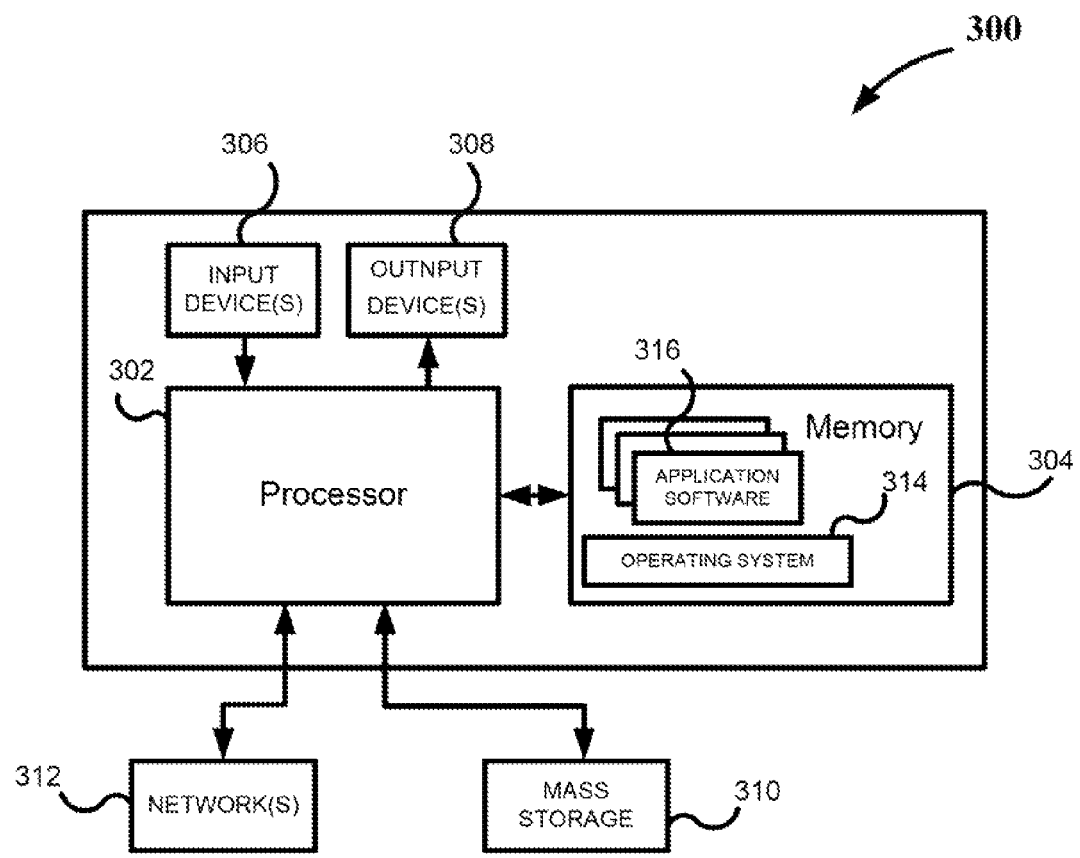
FIG. 3 shows exemplary hardware for implementing the system for creating content for electronic, internet and paper dictionaries using the techniques described in this application, in accordance with an embodiment of the present disclosure.

FIG. 3 shows exemplary hardware for implementing the system for creating content for electronic, internet and paper dictionaries using the techniques described in this application, in accordance with an embodiment of the present disclosure.

Referring to FIG. 3, the hardware 300 typically includes at least one processor 302 coupled to a memory 304. The processor 302 may represent one or more processors (e.g. microprocessors), and the memory 304 may represent random access memory (RAM) devices comprising a main storage of the hardware 300, as well as any supplemental levels of memory, e.g., cache memories, non-volatile or back-up memories (e.g. programmable or flash memories), read-only memories, etc. In addition, the memory 304 may be considered to include memory storage physically located elsewhere in the hardware 300, e.g. any cache memory in the processor 302 as well as any storage capacity used as a virtual memory, e.g., as stored on a mass storage device 310.

The hardware 300 also typically receives a number of inputs and outputs for communicating information externally. For interface with a user or operator, the hardware 300 may include one or more user input devices 306 (e.g., a keyboard, a mouse, imaging device, scanner, etc.) and a one or more output devices 308 (e.g., a Liquid Crystal Display (LCD) panel, a sound playback device (speaker). To embody the present invention, the hardware 300 must include at least one screen device.

For additional storage, the hardware 300 may also include one or more mass storage devices 310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 300 may include an interface with one or more networks 312 (e.g., a local area network (LAN), a wide area network (WAN), a wireless network, and/or the Internet among others) to permit the communication of information with other computers coupled to the networks. It should be appreciated that the hardware 300 typically includes, suitable analog and/or digital interfaces between the processor 302 and each of the components 304, 306, 308, and 312 as is well known in the art.

The hardware 300 operates under the control of an operating system 314, and executes various computer software applications, components, programs, objects, modules, etc. to implement the techniques described above. In particular, the computer software applications will include the client dictionary application, in the case of the client user device 102. Moreover, various applications, components, programs, objects, etc., collectively indicated by reference 316 in FIG. 3, may also execute on one or more processors in another computer coupled to the hardware 300 via a network 312, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A computer-implemented method for generating examples for electronic dictionaries to serve as an aid to translation between languages performed by one or more processors, the method comprising:
creating an electronic dictionary example by:
acquiring at least one dictionary entry comprising a headword $W_j$ in a source language and at least one translation $T_{j1}, T_{j2}, \ldots T_{jn}$ for the headword $W_j$ in a target language;
generating a first set comprising possible forms for the headword $W_j$ in the source language and a second set comprising possible forms for each translation $T_{j1}, T_{j2}, \ldots T_{jn}$ in the target language;
searching a corpus of translations, where the corpus of translations is a preexisting corpus of translation sentence pairs, each translation sentence pair comprising a first sentence in the source language and a second sentence in the target language, where the first sentence is a translation of the second sentence, and the searching includes searching at least one first sentence in the source language included in the corpus of translations and searching at least one second sentence in the target language in the corpus of translations;
identifying in the corpus of translations at least one translation sentence pair, from either the searching of the at least one first sentence in the source language or the searching of the at least one second sentence in the target language, that consists of the first sentence that incorporates the headword $W_j$, or one of its generated forms, and the second sentence that incorporates the translation $T_{jn}$ or one of its generated forms; and
providing the at least one translation sentence pair to a user.

2. The computer-implemented method of claim 1, wherein said searching comprises searching the corpus of translations for at least one translation sentence that includes one of the generated forms for the headword $W_j$, in a first part of the pair, and one of the generated forms for the translation $T_{jn}$, in a second part of the pair.

3. The computer-implemented method of claim 1, wherein the first set comprises all possible forms for the headword $W_j$.

4. The computer-implemented method of claim 1, wherein the second set comprises all possible forms for each translation $T_{j1}, T_{j2}, \ldots T_{jn}$.

5. The computer-implemented method of claim 1, wherein the method is performed for each dictionary entry of a bilingual or multilingual dictionary.

6. The computer-implemented method of claim 1, wherein providing the at least one translation sentence pair to a user comprises inserting each translation sentence pair into the dictionary entry.

7. The computer-implemented method of claim 1, further comprising responsive to user selection of a particular translation $T_{jn}$ in the dictionary entry, retrieving all instances of other headwords $W_j$ that have said translation $T_{jn}$ as a translation.

8. The computer-implemented method of claim 1, further comprising in the case of the searching yielding a plurality of translation sentence pairs, arranging the plurality of translation sentence pairs in the dictionary entry based on a predefined criterion.

9. The computer-implemented method of claim 8, wherein the predefined criterion includes at least one criterion selected from the group consisting of translation frequency, integral rankings provided by users or experts, and rankings associated with the corpus of translations.

10. The computer-implemented method of claim 8, further comprising filtering the plurality of translation sentence pairs based on part-of-speech information.

11. The computer-implemented method of claim 8, further comprising filtering the plurality of translation sentence pairs based on subject-domain information.

12. The computer-implemented method of claim 1, further comprising, in the case of there being a plurality of translation sentence pairs, performing a selection operation to select translation sentence pairs for providing to the user.

13. The computer-implemented method of claim 12, wherein the selection operation is performed based on a selection criteria that compares two translation sentence pairs and rejects one if it is similar to the other.

14. The computer-implemented method of claim 1, wherein the at least one translation sentence pair comprises the headword $W_j$ in a first part and one of the translation $T_{jn}$, its generated form, and a semantically expanded form, in a second part.

15. The computer-implemented method of claim 14, wherein the semantically expanded form comprises words that are semantically close to or synonymous with the translation $T_{jn}$.

16. The computer-implemented method of claim 1, wherein each translation sentence pair is selected based on at least one of semantic class information, semantemes, and pragmatic descriptions.

17. A system, comprising:
a processor; and
a memory coupled to the processor, the memory storing instructions which when executed by the processor causes the system to perform a method for generating examples to serve as aid to translation between languages, the method comprising:
creating an electronic dictionary example by:
for at least one dictionary entry comprising a headword $W_j$ in a source language and at least one translation $T_{j1}, T_{j2}, \ldots T_{jn}$ for the headword $W_j$ in a target language:
generating a first set comprising possible forms for the headword $W_j$ in the source language and a second set comprising possible forms for each translation $T_{j1}, T_{j2}, \ldots T_{jn}$ in the target language;
searching a corpus of translations, where the corpus of translations is a preexisting corpus of translation sentence pairs, each translation sentence pair comprising a first sentence in the source language and a second sentence in the target language, where the first sentence is a translation of the second sentence, and the searching includes searching at least one first sentence in the source language included in the corpus of translations and searching at least one second sentence in the target language in the corpus of translations;
identifying in the corpus of translations at least one translation sentence pair, from either the searching of the at least one first sentence in the source language or the searching of the at least one second sentence in the target language, that consists of the first sentence that incorporates the headword $W_j$, or one of its generated forms, and the second sentence that incorporates the translation $T_{jn}$ or one of its generated forms; and
providing the at least one translation sentence pair to a user.

18. The system of claim 17, wherein said searching comprises searching the corpus of translations for at least one translation sentence that includes one of the generated forms for the headword $W_j$, in a first part of the pair, and one of the generated forms for the translation $T_{jn}$, in a second part of the pair.

19. The system of claim 17, wherein the first set comprises all possible forms for the headword $W_j$.

20. The system of claim 17, wherein the second set comprises all possible forms for each translation $T_{j1}, T_{j2}, \ldots T_{jn}$.

21. The system of claim 17, wherein the method is performed for each dictionary entry of a bilingual or multilingual dictionary.

22. The system of claim 17, wherein providing the at least one translation sentence pair to a user comprises inserting each translation sentence pair into the dictionary entry.

23. The system of claim 17, further comprising responsive to user selection of a particular translation $T_{jn}$ in the dictionary entry, retrieving all instances of other headwords $W_j$ that have said translation $T_{jn}$ as a translation.

24. The system of claim 17, further comprising in the case of the searching yielding a plurality of translation sentence pairs, arranging the plurality of translation sentence pairs in the dictionary entry based on a predefined criterion.

25. The system of claim 24, wherein the predefined criterion includes at least one criterion selected from the group consisting of translation frequency, integral rankings provided by users or experts, and rankings associated with the corpus of translations.

26. The system of claim 24, further comprising filtering the plurality of translation sentence pairs based on part-of-speech information.

27. The system of claim 8, further comprising filtering the plurality of translation sentence pairs based on subject-domain information.

28. The system of claim 1, further comprising, in the case of there being a plurality of translation sentence pairs, performing a selection operation to select translation sentence pairs for providing to the user.

29. The system of claim 28, wherein the selection operation is performed based on a selection criteria that compares two translation sentence pairs and rejects one if it is similar to the other.

30. The system of claim 1, wherein the at least one translation sentence pair comprises the headword $W_j$ in a first part and one of the translation $T_{jn}$, its generated form, and a semantically expanded form, in a second part.

31. The system of claim 30, wherein the semantically expanded form comprises words that are semantically close to or synonymous with the translation $T_{jn}$.

32. The system of claim 1, wherein each translation sentence pair is selected based on at least one of semantic class information, semantemes, and pragmatic descriptions.

33. A non-transitory computer-readable medium having stored thereon a sequence of instructions which when executed by a processing system, cause the system to perform a method for generating examples to serve as aid to translation between languages, the method comprising:
creating an electronic dictionary example by:
for at least one dictionary entry comprising a headword $W_j$ in a source language and at least one translation $T_{j1}, T_{j2}, \ldots T_{jn}$ for the headword $W_j$ in a target language:

generating a first set comprising possible forms for the headword $W_j$ in the source language and a second set comprising possible forms for each translation $T_{j1}, T_{j2}, \ldots T_{jn}$ in the target language;

searching a corpus of translations, where the corpus of translations is a preexisting corpus of translation sentence pairs, each translation sentence pair comprising a first sentence in the source language and a second sentence in the target language, where the first sentence is a translation of the second sentence, and the searching includes searching at least one first sentence in the source language included in the corpus of translations and searching at least one second sentence in the target language in the corpus of translations;

identifying in the corpus of translations for at least one translation sentence pair, from either the searching of the at least one first sentence in the source language or the searching of the at least one second sentence in the target language, that consists of the first sentence that incorporates the headword $W_j$, or one of its generated forms, and the second sentence that incorporates the translation $T_{jn}$ or one of its generated forms; and providing the at least one translation sentence pair to a user.

34. The non-transitory computer-readable medium of claim 33, wherein the at least one translation sentence pair comprises the headword $W_j$, in a first part and one of the translation $T_{jn}$, its generated form, and a semantically expanded form, in a second part.

* * * * *